United States Patent
Hornung

(10) Patent No.: US 7,573,693 B2
(45) Date of Patent: Aug. 11, 2009

(54) SAFETY SWITCHING DEVICE AND METHOD FOR FAILSAFE SHUTDOWN OF AN ELECTRIC LOAD

(75) Inventor: Guenter Hornung, Leinfelden-Echterdingen (DE)

(73) Assignee: Pilz GmbH & Co., Ostfildern (DE)

( * ) Notice: Subject to any disclaimer, the term of this patent is extended or adjusted under 35 U.S.C. 154(b) by 277 days.

(21) Appl. No.: 11/280,637

(22) Filed: Nov. 16, 2005

(65) Prior Publication Data
US 2006/0077613 A1     Apr. 13, 2006

Related U.S. Application Data

(63) Continuation of application No. PCT/EP2004/004352, filed on Apr. 24, 2004.

(30) Foreign Application Priority Data
May 23, 2003  (DE) ................ 103 25 363

(51) Int. Cl.
*H02H 3/22* (2006.01)
(52) U.S. Cl. .................... 361/111; 361/118
(58) Field of Classification Search ........... 361/111, 361/118, 119
See application file for complete search history.

(56) References Cited

U.S. PATENT DOCUMENTS

| | | | |
|---|---|---|---|
| 4,167,030 A | 9/1979 | Heidt | |
| 4,528,486 A * | 7/1985 | Flaig et al. | 318/400.21 |
| 4,581,571 A * | 4/1986 | Hansen | 320/136 |
| 4,613,932 A * | 9/1986 | Cibulka et al. | 363/54 |
| 5,900,722 A * | 5/1999 | Scott et al. | 322/46 |
| 6,020,735 A * | 2/2000 | Barnett et al. | 324/133 |
| 6,381,156 B1 * | 4/2002 | Sakai et al. | 363/65 |
| 6,570,272 B2 | 5/2003 | Dickhoff | |
| 7,133,265 B2 * | 11/2006 | Lee | 361/42 |
| 2002/0130557 A1 | 9/2002 | Dickhoff | |
| 2002/0130645 A1 * | 9/2002 | Tsai et al. | 323/274 |

FOREIGN PATENT DOCUMENTS

| | | |
|---|---|---|
| DE | 27 32 512 | 1/1979 |
| DE | 197 34 589 B4 | 10/1998 |
| DE | 199 54 460 A1 | 9/2001 |
| DE | 100 45 651 A1 | 4/2002 |
| WO | WO 01/67610 A1 | 9/2001 |

* cited by examiner

*Primary Examiner*—Albert W Paladini
(74) *Attorney, Agent, or Firm*—Harness, Dickey & Pierce, P.L.C.

(57) ABSTRACT

The invention relates to a safety switching device for the failsafe shutdown of an electric load, such as an electrically driven machine. The safety switching device has a signal processing part for receiving and evaluating an input-side switching signal, which, for example, originates from an emergency stop switch. It also has at least one switching element which, controlled by the signal processing part, provides an output-side switching signal for shutting down the load. An anti-surge element is provided for canceling reaction voltage spikes when the load is shut down. The anti-surge element has at least a first and a second anti-surge operating mode, which can be activated as an alternative to one another.

14 Claims, 2 Drawing Sheets

SAFETY SWITCHING DEVICE AND METHOD FOR FAILSAFE SHUTDOWN OF AN ELECTRIC LOAD

CROSS-REFERENCES TO RELATED APPLICATIONS

The present application is a continuation of co-pending international patent application PCT/EP2004/004352, filed on Apr. 24, 2004 and published as WO 2004/105067 A1 in German language, which international application claims priority under the Paris convention from German patent application 103 25 363.7, filed on May 23, 2003.

BACKGROUND OF THE INVENTION

The present invention relates to a safety switching device and a method for the failsafe shutdown of an electric load, in particular for shutting down an electrically driven machine. The invention particularly relates to a safety switching device and a method for the failsafe shutdown of an inductive load that causes overvoltage spikes when being shut down.

Safety switching devices in terms of the present invention are provided for controlling technical systems and devices in a failsafe manner, and in particular shutting them down in a failsafe manner, if required, in order to prevent, for example, a risk to operating personnel. "Failsafe" in this case means that the successful shutdown operation needs to be ensured even when a fault occurs in the safety switching device or in its environment, for example when a component of the safety switching device fails. Therefore, prior art safety switching devices are generally of a redundant design and, in numerous countries, they require special approval from a competent supervisory authority. With regard to the present invention, safety switching devices are those which at least meet Category 3 of the European Standard EN 954-1 or a comparable safety standard, and also those which are specifically envisaged for a corresponding safety-critical application. In this regard, however, the invention is not restricted to safety switching devices in the narrower sense, but it also comprises safety controllers and field bus-based safety systems, which implement the functionality of a safety switching device of the type to be described in more detail below in addition to possibly complex control tasks.

The signal processing part of the safety switching device serves the purpose of receiving and evaluating an input-side switching signal, which is produced in the case of conventional applications, for example, by an emergency stop button, a guard door, a light barrier arrangement, two-handed control switches or other safety transmitters. The signal processing part evaluates the switching signal in a failsafe manner and, on the basis thereof, controls at least one, but generally two or more, output-side switching elements. The output signal of the switching elements is fed to one or more actuators, such as contactors, via whose working contacts the current is supplied to a monitored machine. Furthermore, solenoid valves, which are part of a hydraulic drive, are often also switched on and off using known safety switching devices.

Contactors, solenoid valves and similar actuators have in common that they represent an inductive load for the safety switching device. This means that, during shutdown, an overvoltage spike occurs, whose level can substantially exceed the normal operating voltage. Therefore, the outputs of prior art safety switching devices generally have an anti-surge element, often what is called an anti-surge diode, which is connected back-to-back in parallel with the input coil of the contactor or solenoid valve. A safety switching device having such an anti-surge diode is known, for example, from DE 199 54 460 A1. In addition, safety switching devices having an anti-surge diode are marketed by the present assignee under the brand name PNOZ®.

However, the anti-surge elements in the known safety switching devices have two principal disadvantages which may be significant to differing extents depending on the practical implementation. A first disadvantage consists in the fact that the current through the contactor coil decays more slowly during shutdown, which delays the shutdown operation. A second disadvantage is undesirable introduction of heat into the safety switching device, which is produced, in particular, by the signal processing part needing to switch the output-side switching elements off and on again frequently for test purposes. The voltage spike which occurs during disconnection is canceled via the anti-surge element arranged in the safety switching device, and the energy stored in the contactor coil is converted into a resistive power loss within the safety switching device.

SUMMARY OF THE INVENTION

Against this background, it is an object of the present invention to provide a safety switching device and a method, which allow a reduction of heat introduced into the safety switching device.

According to one aspect of the invention, there is provided a safety switching device for failsafe shutdown of an electric load, the safety switching device comprising a signal processing part for receiving and evaluating an input-side switching signal, at least one switching element adapted to provide an output-side switching signal for shutting down the load, the at least one switching element being controlled by the signal processing part, and at least one anti-surge element for canceling voltage spikes when the load is shut down, wherein the anti-surge element has at least a first and a second anti-surge operating mode, which can be activated as an alternative to one another.

According to another aspect of the invention, there is provided a method for failsafe shutdown of an electric load, comprising the steps of:

receiving and evaluating an input-side switching signal, shutting down the load as a function of the input-side switching signal, and canceling voltage spikes by means of an anti-surge element when the load is being shut down, wherein the anti-surge element has at least a first and a second anti-surge operating mode, which are activated as an alternative to one another.

Preferably, the anti-surge element is switched over from the first to the second anti-surge operating mode when the load is being shut down.

The invention is thus based on the idea of designing the anti-surge element to be variable. This makes it possible to design the anti-surge element differently for different situations and requirements and to optimize it in each case to the intended use. The anti-surge element thus has different anti-surge operating modes, which can be activated depending on the intended use and situation.

For a safety shutdown, the anti-surge element is preferably designed such that a decay of the current in the inductive load is achieved as rapid as possible. In this situation, the introduction of heat into the safety switching device is of minor importance, since of primary concern here is the rapid and safe shutdown of the load.

Since a safety shutdown occurs relatively rarely, the introduction of heat is a small problem in this situation. However, this is not the case for shutdown tests which are typically carried out on a regular basis. Since these shutdown tests occur regularly during operation of the safety switching device and, in addition, there is no superordinate safety purpose standing in the way, it is advantageous in this case for the anti-surge element not primarily to be optimized in terms of an optimum speed but in terms of as little introduction of heat as possible.

The different aims can be achieved jointly by designing the anti-surge element for different anti-surge operating modes. Furthermore, an anti-surge element having different anti-surge operating modes can also be optimized more easily with respect to individual properties of different (inductive) loads.

In a preferred refinement of the invention, the anti-surge operating mode can be set by the signal processing part.

This refinement has the advantage that the signal processing part has full control over the function of the anti-surge element, with the result that, in the event of a safety shutdown triggered by the signal processing part, an optimally short decay time is ensured.

In a further refinement, the signal processing part has a first operating state, in which the load is switched on, and a second operating state for shutting down the load. The anti-surge element is preferably in the first anti-surge operating mode during the first operating state and in the second anti-surge operating mode during the second operating state.

This refinement makes optimum use of the basic idea by changing the anti-surge operating mode, in particular in the case of a safety shutdown. While the safety shutdown primarily serves the purpose of switching the connected load over to a non-hazardous state, the connected load often remains largely unaffected by the internal functional sequences of the safety switching device during steady-state operation. Even if the at least one output-side switching element is briefly opened for test purposes, the connected load often remains uninfluenced owing to the sluggishness of the actuators. The change in the anti-surge operating modes when the load is shut down makes it possible to adapt in optimum fashion to the different layers of interest during steady-state monitoring mode and in the event of a safety shutdown.

In a further refinement, the signal processing part is designed, in its first operating state, to switch the at least one switching element off in a pulsed manner.

This refinement continues what has been said before, since a change in the anti-surge operating mode is particularly advantageous if a distinction is made between shutdown operations for test purposes and "real" safety shutdowns. Due to the different layers of interest, the change in the anti-surge operating mode is in this case particularly effective.

In a further refinement, the anti-surge element has a low response threshold in the first anti-surge operating mode and a high response threshold in the second anti-surge operating mode.

In this refinement, the anti-surge element is in particular optimized in terms of minimizing the introduction of heat into the safety switching device during the shutdown tests, and, on the other hand, allowing a rapid decay as possible of the current through the inductive load in the event of a safety shutdown.

In a further refinement, an overvoltage protection element is arranged in parallel with the switching element.

In addition to the various anti-surge operating modes, this refinement offers improved protection of the output-side switching element and makes possible a more rapid safety shutdown. For example, the anti-surge element in the second anti-surge operating mode can be optimized in terms of the safety shutdown without taking into account the protection of the output-side switching element.

In a further refinement, the overvoltage protection element has a third response threshold, which is higher than the low response threshold of the anti-surge element.

This measure uses the abovementioned concepts. Furthermore, it has the particular advantage that the energy stored in inductive load is kept "outside" during the shutdown tests, i.e. is not converted into resistive heat loss by means of the overvoltage protection element. A further advantage of this measure is the fact that the inductive load does not need to be recharged, or only needs to be recharged to a small extent, once the shutdown test has been completed, which makes it easier to carry out the shutdown tests.

In a further refinement, the anti-surge element comprises a switchable semiconductor component, preferably a thyristor, as the anti-surge component.

Switchable semiconductor components, and in particular thyristors, have proven to be particularly effective at minimizing the introduction of heat into the switching device when carrying out shutdown tests owing to their low forward voltage in the on state.

In a further refinement, the switchable semiconductor component is integrated in the safety switching device.

This refinement makes it easier to install the novel safety switching device, since the anti-surge element does not need to be wired from the user side in addition to the safety switching device. On the other hand, it is here possible to integrate the anti-surge element into the safety switching device without unduly increasing the thermal loading of the safety switching device.

It goes without saying that the above-mentioned features, and those yet to be explained below, can be used not only in the combination specified in each case but also in other combinations or on their own, without leaving the scope of the present invention.

BRIEF DESCRIPTION OF THE FIGURES

Exemplary embodiments of the invention will be explained in more detail in the description below and are illustrated in the drawing, in which.

DESCRIPTION OF PREFERRED EMBODIMENTS

Figure 1:
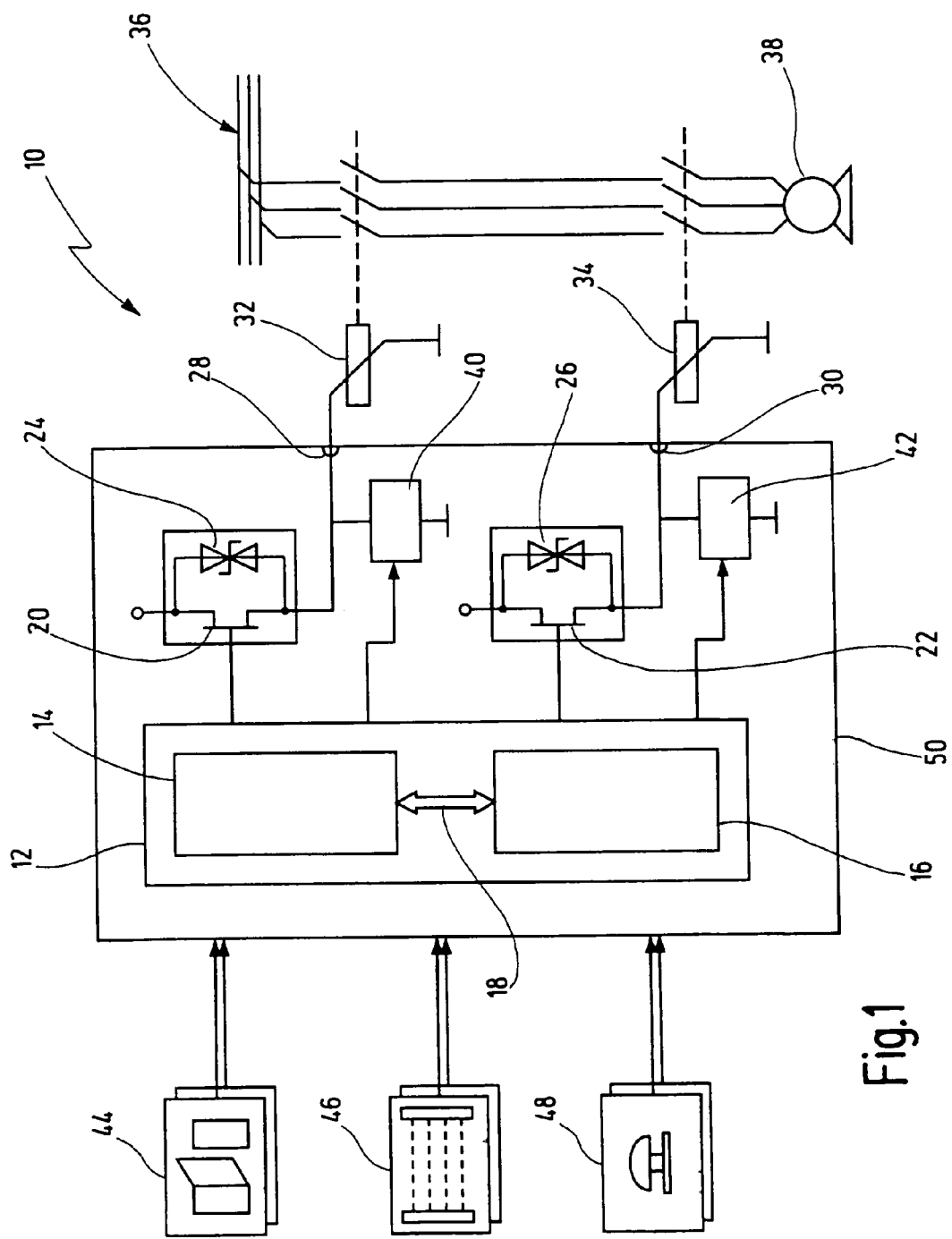
FIG. 1 shows a schematic block diagram of an exemplary embodiment of the novel safety switching device.

In FIG. 1, an exemplary embodiment of a novel safety switching device is overall given the reference numeral 10.

The safety switching device 10 has a signal processing part 12, which is here illustrated in simplified form with two redundant microcontrollers 14, 16. The two redundant microcontrollers 14, 16 monitor one another, as is indicated by an arrow 18. It goes without saying that each of the two microcontrollers 14, 16 has a suitable peripheral (memories, communication interfaces etc.), which is not illustrated here for sake of simplicity. Furthermore, more than only two redundant channels may also be provided for the signal processing.

The safety switching device 10 has two redundant, output-side switching elements 20, 22, which are illustrated here as electronic switching elements (semiconductor components, in this case MOS transistors) in accordance with a preferred embodiment. In the case of such switching elements, the advantages of the present invention come to fruition in a particularly effective manner, even if the invention is not restricted to these switching elements. A protection element 24, 26 is connected in parallel with each switching element 20, 22. The protection elements 24, 26 in this case bridge the source-drain path of the two switching elements 20, 22 and are implemented here in each case in the form of two opposing Zener diodes in accordance with a preferred exemplary embodiment.

The output signals of the two switching elements 20, 22 are fed to two externally connected actuators 32, 34 via outputs 28, 30. The actuators 32, 34 are in this case represented as contactors, whose respective working contacts are arranged in series with one another. A three-phase power supply 36 is connected to a drive 38, which acts as an example in this case, via the working contacts of the contactors 32, 34. The drive 38 may be, for example, an actuating drive for an automated robot or a conveyor belt. In further exemplary embodiments, the actuators 32, 34 are solenoid valves, by means of which, for example, the working movement of a hydraulic press is controlled.

The safety switching device 10 also has two anti-surge elements 40, 42, with one respective element being connected to the switching element 20, 22, in parallel with the corresponding output 28, 30. A preferred implementation of the anti-surge elements 40, 42 will be explained in more detail below with reference to FIG. 2. As is illustrated in FIG. 1, the anti-surge elements 40, 42 are in this case controlled and are switched over in terms of their anti-surge operating modes by the signal processing part 12 (as will be explained further below).

On the input side, the safety switching device 10 picks up the signals from one or more safety transmitters, which are in this case represented, by way of example, by a guard door sensor 44, a light barrier arrangement 46 and by an emergency stop button 48. This joint representation of the safety transmitters is exemplary since, in practice, safety switching devices are often especially designed for a type of safety transmitter. However, there are also safety switching devices, to which different types of safety transmitters can be connected, as is illustrated here. It goes without saying that the invention is not restricted to safety switching devices for the purpose of evaluating the safety transmitters shown here, but also includes safety switching devices for other types of signal sensors. In particular, a previous safety switching device may also function as the signal sensor, such as is described, for example, in WO 01/67610 A1.

The invention is illustrated here using the example of a safety switching device 10, in which the signal processing part 12 and the switching elements 20, 22 as well as the anti-surge elements 40, 42 are arranged in a common device housing 50. The safety switching device 10 can thus be integrated as a compact module in an overall system, for example by being mounted and wired in a switchgear cabinet. As has already been mentioned initially, the invention is not restricted to this, however. As an alternative, the invention may also be used in a complex safety controller, as is offered, for example, by the applicant under the brand name PSS®, or in the case of a field bus-based system having distributed switching elements.

In the description below of a preferred exemplary embodiment of the anti-surge element 40, same reference numerals are used for the same elements as before.

Figure 2:
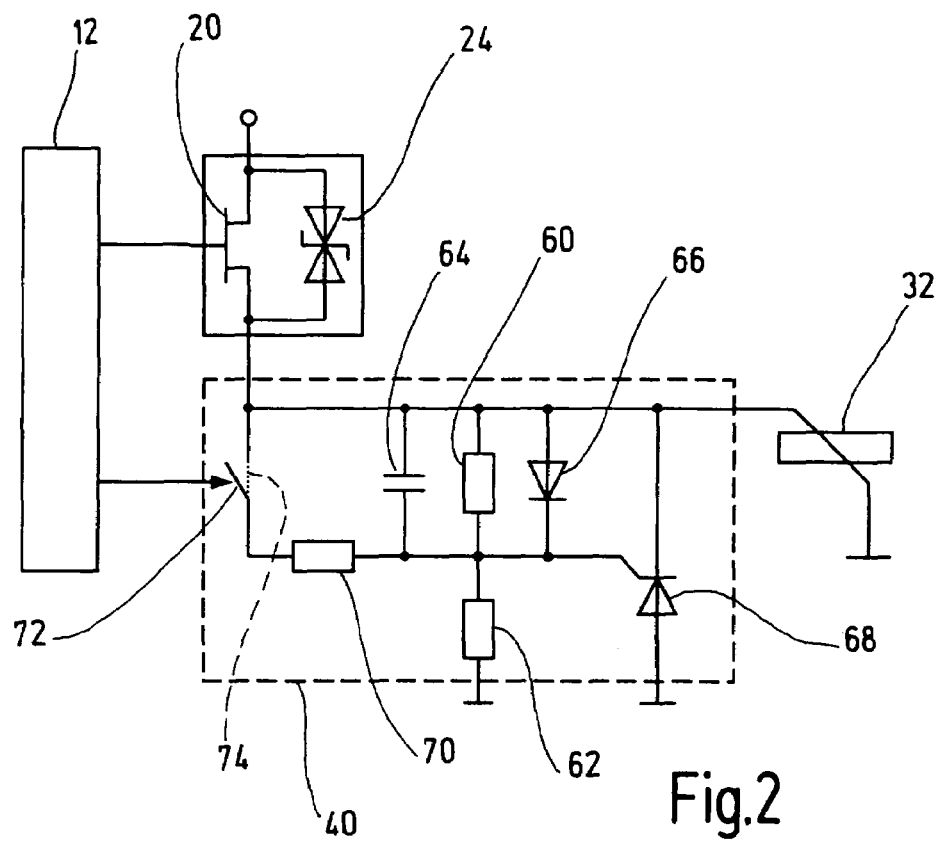
FIG. 2 shows a preferred exemplary embodiment of an anti-surge element in the novel safety switching device from FIG. 1.

FIG. 2 illustrates the anti-surge element 40 in a preferred circuit design. It contains a voltage divider comprising two resistors 60, 62, the free end of the resistor 60 being connected to the output of the switching element 20, and the free end of the resistor 62 being connected to ground. A capacitance 64 and a protective diode 66, which is arranged in the forward direction, are connected in parallel with the resistor 60. Furthermore, a thyristor 68 is arranged in parallel with the voltage divider 60, 62, the control terminal of said thyristor 68 being connected to the junction of the two resistors 60, 62. The thyristor 68 thus obtains a control voltage which is determined by the divider ratio of the voltage divider 60, 62.

Furthermore, the anti-surge element 40 has a series circuit comprising a resistor 70 and a switch, which is illustrated here in a first switching position 72 (open). The second (closed) switching position is indicated at reference numeral 74. The series circuit comprising the resistor 70 and the switch 72/74 is connected in parallel with the resistor 60. This means that the divider ratio of the voltage divider 60, 62 and thus the triggering voltage applied to the gate trigger terminal of the thyristor 68 can be varied by means of the switch 72/74.

Figure 3:
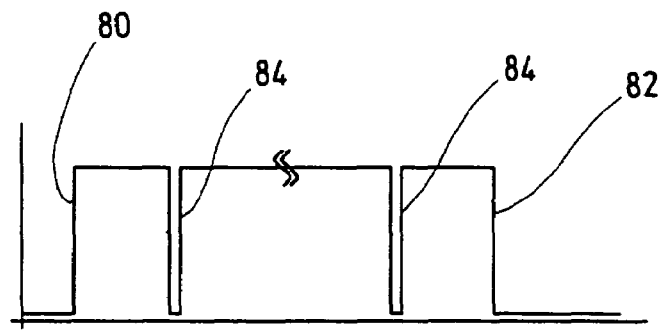
FIG. 3 shows a simplified illustration of the signal profile at the output of the novel safety switching device shown in FIG. 1 without taking into account disconnection voltage spikes.

In FIG. 3, the output signal of the safety switching device 10 at the outputs 28, 30 is illustrated in simplified form. With a slope 80, the voltage at the outputs 28, 30 of the safety switching device 10 is switched on. The contactors 32, 34 as a result have current flowing through them and close their working contacts. As a result, the drive 38 is connected to the power supply 36 and starts up.

While the drive 38 is running (operating mode), the safety switching device 10 monitors the sensor signals, which are applied to the input, from the safety transmitters 44, 46, 48. The signal processing part 12 evaluates the input-side switching signals from the safety transmitters in a failsafe manner and possibly triggers a safety shutdown of the drive 38, which is illustrated in FIG. 3 by a slope 82. For the safety shutdown, the signal processing part 12 opens the switching elements 20, 22, with the result that the voltage at the outputs 28, 30 drops off and, as a result, the working contacts of the contactors 32, 34 are opened. This causes the drive 38 to be isolated from the power supply 36.

During the operating mode, which is also referred to as the first operating state in the following, the signal processing part 12 carries out regular shutdown tests by opening the switching elements 20, 22 briefly (in a pulsed manner) and closing them again. Two such shutdown tests are illustrated in the output signal in FIG. 3 at reference numeral 84.

The shutdown pulses 84 are generally shorter than the release time of the contactors 32, 34, with the result that the drive 38 continues to run unimpeded despite the shutdown pulses 84. If possible, the shutdown pulses 84 may also be filtered out upstream of the contactors 32, 34 for undisturbed operation of the drive 38. The signal processing part 12 can monitor the successful opening of the switching elements 20, 22 via a readback line (not illustrated here). The signal processing part 12 can thus ensure that the switching elements 20, 22 function in a reliable manner for the case of a safety shutdown.

Figure 4:
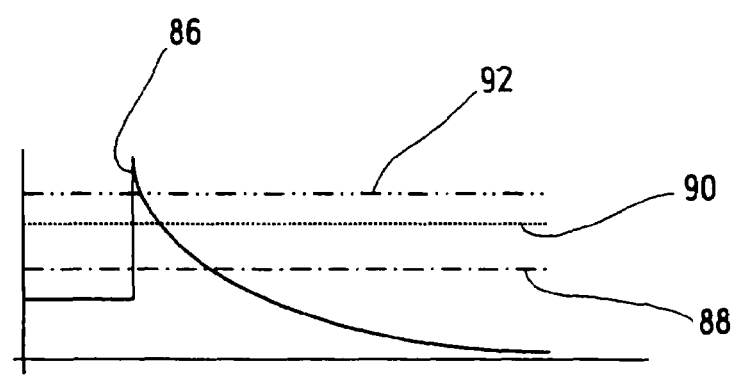
FIG. 4 shows a simplified illustration of the magnitude signal profile when an inductive load is shut down.

As is known to those skilled in the art in this field, the shutdown (even for a short period of time) of an inductive load results in a voltage spike, which is illustrated in simplified form in FIG. 4 in the magnitude profile (reference numeral 86). The reaction of such voltage spikes 86 on the outputs of the safety switching device 10 is brought under control by the anti-surge elements 40, 42.

The mode of operation of the anti-surge elements 40, 42 is as follows: in the operating mode, the voltage spike 86 is built up in the case of a shutdown pulse 84. This voltage spike 86 produces a triggering voltage at the trigger terminal of the thyristor 86 via voltage divider 60, 62. The dimensions of the voltage divider 60, 62 are selected such that the response threshold of the thyristor 68 is lower than the response threshold of the protective elements 24, 26. In FIG. 4, the two response thresholds are illustrated by reference numerals 88 and 90. When the response threshold 88 is exceeded, the thyristor 68 is triggered and thus closes a discharge circuit via the contactor 32. Since the thyristor has a low forward voltage of approximately 1.4 volts, in this case only little heat is introduced into the safety switching device 10.

As soon as the switching element 20, 22 is closed again at the end of the shutdown test or if the extinction current through the contactor 32 has decayed to a sufficient extent, the thyristor 68 switches over to its off state again. Here, the response threshold 88 of the thyristor 68 is essentially determined by the divider ratio of the voltage divider 60, 62.

If the signal processing part 12 would now like to trigger a safety shutdown, it brings the anti-surge element 40, 42 into its second anti-surge operating mode by actuating the switch 72/74. Owing to the different divider ratio of the voltage divider, the thyristor 68 is now triggered only at a higher response threshold, which is indicated in FIG. 4 at reference numeral 92. The response threshold 92 in FIG. 4 is higher than the response threshold 90 of the protective element 24, 26, i.e. in this case the protective element 24, 26 responds even before the thyristor 68. The response thresholds 90, 92 may, however, also be selected to be approximately equal or in the reverse sequence to that in FIG. 4. Owing to the flexible dimensioning of the response threshold 92 for a safety shutdown, the demagnetization behavior of the contactors 32, 34 can be set to an optimum speed in the operating mode independently of thermal considerations. If possible, extinction of the voltage spike 86 can be completely suppressed by the resistor 70 being replaced by a short circuit (R=0 ohm).

For sake of completeness, it should be mentioned that the capacitance 64 serves the purpose of smoothing the voltage between the trigger terminal and the cathode of the thyristor, while the protective diode 66 protects the thyristor 68 against impermissibly high inverse voltages.

With the arrangement shown for the anti-surge element 40, 42, the introduction of heat owing to shutdown tests on safety switching devices could be reduced by the applicant from approximately 12 watts to approximately 1 watt. This makes possible a more compact design of the safety switching devices and also reduces the risk of thermally induced failures, i.e. the failsafety of the safety switching devices has been increased by the novel anti-surge elements 40, 42.

What is claimed is:

1. A safety switching device for failsafe shutdown of an electric load in response to an input-side switching signal provided from a safety transmitter, the safety switching device comprising:
   a signal processing part for receiving and evaluating the input-side switching signal from the safety transmitter,
   at least one switching element adapted to provide an output-side switching signal for shutting down the load, the at least one switching element being controlled by the signal processing part in response to the input-side switching signal, and
   at least one anti-surge element for canceling voltage spikes when the load is shut down,
   wherein the anti-surge element has at least a first and a second anti-surge operating mode configured to be activated as an alternative to one another,
   wherein the anti-surge element has a low response threshold in the first anti-surge operating mode and a high response threshold in the second anti-surge operating mode, and
   wherein the anti-surge element is switched over from the first to the second anti-surge operating mode if the signal processing part triggers a safety shutdown by appropriately controlling the at least one switching element.

2. The safety switching device of claim 1, wherein the signal processing part is configured to select between the first and the second anti-surge operating mode.

3. The safety switching device of claim 1, wherein the signal processing part has a first operating state, during which the load is switched on, and a second operating state for shutting down the load.

4. The safety switching device of claim 3, wherein the anti-surge element is in the first anti-surge operating mode during the first operating state, and it is in the second anti-surge operating mode during the second operating state.

5. The safety switching device of claim 3, wherein the signal processing part is designed, in its first operating state, to switch off the at least one switching element in a continuing pulsed manner.

6. The safety switching device of claim 1, further comprising an overvoltage protection element which is arranged in parallel to the at least one switching element.

7. The safety switching device of claim 6, wherein the anti-surge element has a low response threshold in the first anti-surge operating mode and a high response threshold in the second anti-surge operating mode, and wherein the overvoltage protection element has a third response threshold, which is higher than the low response threshold of the anti-surge element.

8. The safety switching device of claim 1, wherein the anti-surge element comprises a switchable semiconductor component as an anti-surge component.

9. The safety switching device of claim 7, wherein the switchable semiconductor component is a thyristor.

10. The safety switching device of claim 7, wherein the switchable semiconductor component is integrated in the safety switching device.

11. The safety switching device of claim 1, wherein the at least one switching element is a semiconductor switching element.

12. A method for failsafe shutdown of an electric load in response to an input-side switching signal provided from a safety transmitter, comprising the steps of:
   receiving and evaluating the input-side switching signal from the safety transmitter,
   shutting down the load as a function of the input-side switching signal, and
   canceling voltage spikes by means of an anti-surge element when the load is being shut down,
   wherein the anti-surge element has at least a first and a second anti-surge operating mode, which are activated as an alternative to one another,
   wherein the anti-surge element has a low response threshold in the first anti-surge operating mode and a high response threshold in the second anti-surge operating mode, and
   wherein the anti-surge element is switched over from the first to the second anti-surge operating mode when the load is being shut down.

13. The safety switching device of claim 1, wherein the safety transmitter is at least one of an emergency stop button, a guard door, a light barrier arrangement and two-handed control switches.

14. A safety switching device for failsafe shutdown of an electric load, the safety switching device comprising:

- a signal processing part for receiving and evaluating an input-side switching signal,
- at least one switching element adapted to provide an output-side switching signal for shutting down the load, the at least one switching element being controlled by the signal processing part, and
- at least one anti-surge element for canceling voltage spikes when the load is shut down, and
- an overvoltage protection element arranged in parallel to the at least one switching element,
- wherein the anti-surge element has at least a first and a second anti-surge operating mode configured to be activated as an alternative to one another,
- wherein the anti-surge element has a low response threshold in the first anti-surge operating mode and a high response threshold in the second anti-surge operating mode, and
- wherein the overvoltage protection element has a third response threshold, which is higher than the low response threshold in the first anti-surge operating mode but lower than the high response threshold in the second anti-surge operating mode.

* * * * *